J. BUCKNELL.
Grain-Drill.
No. 41,474. Patented Feb. 9, 1864.
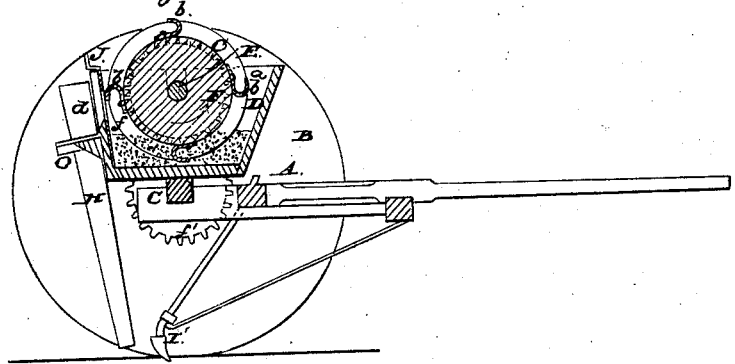
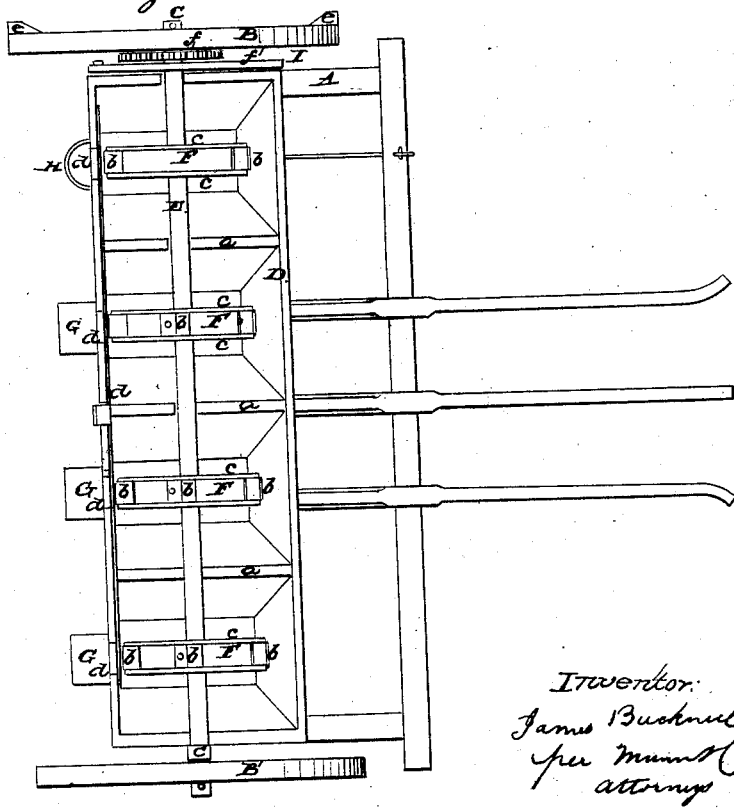

UNITED STATES PATENT OFFICE.

JAMES BUCKNELL, OF DECORAH, IOWA.

IMPROVEMENT IN GRAIN-DRILLS.

Specification forming part of Letters Patent No. 41,474, dated February 9, 1864.

*To all whom it may concern:*

Be it known that I, JAMES BUCKNELL, of Decorah, in the county of Winneshiek and State of Iowa, have invented a new and Improved Seed-Planter; and I do hereby declare that the following is a full, clear, and exact description of the same, reference being had to the accompanying drawings, making a part of this specification, in which—

Figure 1 represents a longitudinal vertical section of my invention. Fig. 2 is a plan or top view of the same.

Similar letters of reference indicate corresponding parts in the several figures.

The object of this invention is a device for distributing seeds of different sizes—such as corn and wheat—in drills or broadcast, as may be desired.

The invention consists in the arrangement of a series of revolving disks, each provided with two or more scoops in the interior of the hopper, in combination with an opening in the side of said hopper and with a regulating-slide and lever, in such a manner that by means of said scoops the seed contained in the hopper is taken up and discharged out of such of the openings as may be left open, and when it is desired to discontinue the discharge of seed by raising the lever the shaft which carries the disks can be thrown out of gear with the driving-wheel and its motion arrested.

To enable others skilled in the art to fully understand and construct my invention, I will proceed to describe it.

A represents a frame, made of timber or any other suitable material, and supported by two wheels, B B′, which run on the ends of a stationary axle, C.

D is the hopper, which is divided by a series of partitions, $a$, into a number of compartments to contain the same or different kinds of seed. The ends of the hopper form the bearings for a shaft, E, which carries the seed-distributing disks F. Each of these disks is provided with two or more scoops, $b$, secured to its circumference between projecting flanges $c$, so that by imparting to the disks a rotary motion in the direction of the arrow marked thereon in Fig. 1 each scoop in passing through the seed takes up a certain quantity and carries it over to one of the openings $d$ in the rear side of the hopper. Through these openings the seed is discharged either on scattering-boards G, if it is desired to sow broadcast, or in a tube, H, which extends down nearly to the ground behind a furrowing-tooth, I′, when it is desired to sow in drills or hills. In this latter case the hills are indicated by markers $e$ on the outside of the driving-wheel B.

The shaft E, which carries the seed-distributing disks F, receives its motion by two gear-wheels, $f f'$, one on the end of said shaft and the other secured to the inner side of the driving-wheel B. A lever which is hinged to the end of the hopper, and which embraces the shaft E, serves to raise the same, and to throw the wheel $f'$ out of gear with the driving-wheel when it is desired to discontinue the discharge of the seed.

The openings $d$ in the rear side of the hopper are regulated by a slide, J, and by moving this slide said openings can either be thrown wide open or closed entirely, as may be desirable.

I do not claim broadly the use of revolving scoops in connection with both scattering-boards and conducting-tubes, by which the machine can be adapted for either broadcast or drill sowing, as I am aware that such a combination has before been used; but

What I claim as new, and desire to secure by Letters Patent, is—

The particular construction of conducting-tubes H, adapted to replace the scatterers G, covering the apertures $d$, and employed in combination with the seed-box D, slide J, shaft E, and scoop-disks F to convert the machine from a broadcast-sower to a drill.

JAMES BUCKNELL.

Witnesses:
NELSON BURDICK,
S. A. TUPPER.